United States Patent [19]
Eino et al.

[11] Patent Number: 5,159,506
[45] Date of Patent: Oct. 27, 1992

[54] MAGNETIC TAPE RECORDING/REPRODUCING APPARATUS WITH IMPROVED TENSION CONTROL MECHANISM

[75] Inventors: Takeshi Eino; Morio Miwa, both of Yokohama, Japan

[73] Assignee: Victor Company of Japan, Ltd., Yokohama, Japan

[21] Appl. No.: 632,092

[22] Filed: Dec. 21, 1990

[30] Foreign Application Priority Data

Dec. 25, 1989 [JP] Japan ................... 1-335723

[51] Int. Cl.$^5$ ............................................ G11B 5/027
[52] U.S. Cl. ............................... 360/85; 360/95; 360/130.22
[58] Field of Search ............... 360/85, 130.22, 130.23, 360/95; 242/197-201

[56] References Cited

U.S. PATENT DOCUMENTS 4,583,136  4/1986  Tsuchida .................. 360/85
4,949,203  8/1990  Kunimaru .................. 365/95 X

FOREIGN PATENT DOCUMENTS 0306230  3/1989  European Pat. Off. .
63-225949  9/1988  Japan .

OTHER PUBLICATIONS

Patent Abstracts of Japan, vol. 13, No. 027 (P-815) Jan. 20, 1989, & JP-A-63 225961 (Victor Company of Japan Ltd.) Sep. 20, 1988.

Primary Examiner—A. J. Heinz
Attorney, Agent, or Firm—Pollock, VandeSande & Priddy

[57] ABSTRACT

A magnetic tape recording/reproducing apparatus of the type having a tension control mechanism for controlling the tape tension at a constant level, wherein a tension arm having at its distal end a tension pole is pivoted on a support member which is movable along a predetermined path between a plurality of mode positions. The pivot axis of the tension arm is, therefore, movable together with the support member so as to keep the tension arm out of interference with a magnetic tape and loading poles even when a path of travel of the magnetic tape is changed. With this movable pivot axis, a tape traveling system of the apparatus is compact in size and has an increased degree of freedom of the arrangement of various component parts.

8 Claims, 6 Drawing Sheets

MAGNETIC TAPE RECORDING/REPRODUCING APPARATUS WITH IMPROVED TENSION CONTROL MECHANISM

BACKGROUND OF THE INVENTION

1. Field of the Invention

The present invention relates generally to magnetic tape recording/reproducing apparatus such as video tape recorders (VTR), and more particularly to a support mechanism incorporated in such apparatus for supporting a tension pole used for the adjustment of the tension on a magnetic tape.

2. Description of the Prior Art

In a video tape recorder (VTR), a segment of the magnetic tape between a supply reel and a take-up reel in a tape cassette is withdrawn from the tape cassette by a loading pole when the tape cassette is loaded. The tape segment thus withdrawn forms a traveling path (hereinafter referred to as "tape path") extending around a drum over a predetermined angular range, the drum having a rotating magnetic head. The VTR includes a tension arm pivotally supported between a supply reel carrier and the drum and disposed adjacent to the tape path. The tension arm has a tension pole upstanding from the distal end thereof. In response to the loading action of the tape cassette, the tension arm turns in a direction to move the tension pole from the unloading position in which the tension pole is disposed in a recess in a front lower portion of the tape cassette, to a position outside the tape cassette. In the recording and reproducing modes, the tension pole is held in contact with the magnetic tape segment running between the supply reel and the drum. During that time, the tension pole changes its position in response to changes of the tension on the magnetic tape. The position or the movement of the tension pole is controlled by adjusting a brake force which is exerted on the supply reel carrier by a brake band provided on the proximal end of the tension arm. Thus, the tension on the magnetic tape is kept constant at all times.

One such VTR is disclosed in Japanese Patent Laid-open Publication No. 63-225949.

In the disclosed VTR, the pivot axis of the tension arm is fixed to a chassis. This fixed attachment of the pivot axis requires the tension arm to be disposed in a position far distant from a range of fluctuation of the tape path and a path of movement of the loading pole, in view of the fluctuation of the tape path and the movement of the loading pole. This arrangement of the tension arm considerably restricts the positioning of other component parts. Consequently, the conventional VTR (i.e. the magnetic tape recording/reproducing apparatus) is low in degree of freedom of the design choice and has a large tape traveling system.

SUMMARY OF THE INVENTION

With the foregoing drawbacks of the prior art in view, it is an object of the present invention to provide a magnetic tape recording/reproducing apparatus incorporating structural features which provide a reduction of the size of a tape traveling system and an increased degree of freedom in determinating the position of component parts to be disposed around a tape path.

In brief, the present invention relates to an improved magnetic tape recording/reproducing apparatus of the type having a tension control mechanism for controlling the tape tension at a constant level, wherein a tension arm having at its distal end a tension pole is pivoted on a support member which is movable along a predetermined path between a plurality of mode positions. The pivot axis of the tension arm is, therefore, movable together with the support member so as to keep the tension arm out of interference with a magnetic tape and loading poles even when a path of travel of the magnetic tape is changed. With this movable pivot axis, a tape traveling system of the apparatus is compact in size and has an increased degree of freedom of the arrangement of various component parts.

More specifically, a magnetic tape recording/reproducing apparatus of this invention comprises means for withdrawing a segment of a magnetic tape between supply and take-up reels in a tape cassette in such a manner that the tape segment forms a traveling path which is variable to conform to a selected one of a plurality of modes of operation of the magnetic tape recording/reproducing apparatus, and means for controlling a tension on the magnetic tape at a constant level tape during at least one of the operation modes of the apparatus, the tension control means including a tension pole engageable with the tape segment to adjust the tension on the magnetic tape, a support member movable along a predetermined path between a plurality of positions corresponding to the operation modes of the apparatus, and a tension arm pivotally mounted on the support member and having a distal end on which the tension pole is disposed, and further having a pivot axis movable together with the support member.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 8:
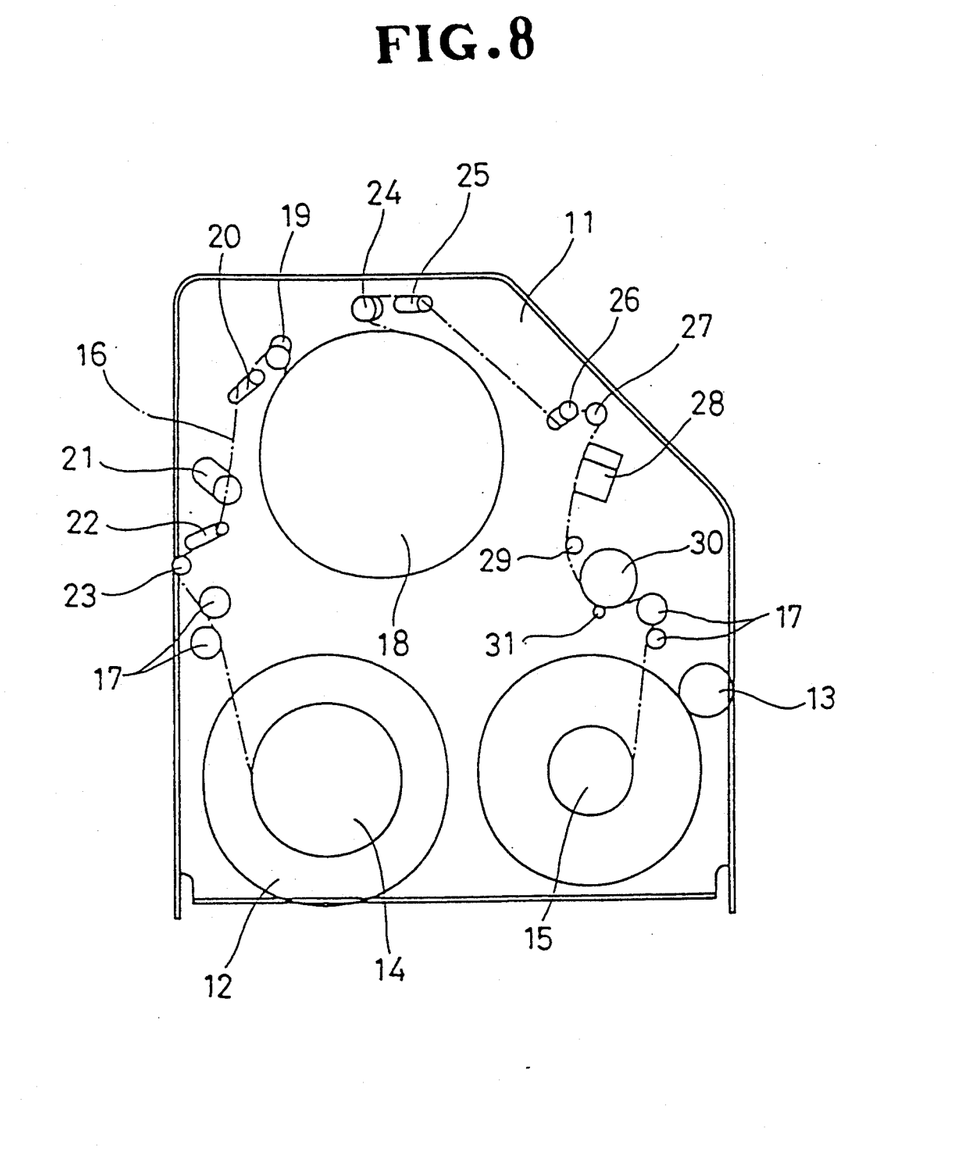
FIG. 8 is a diagrammatical plan view of a tape traveling system of the apparatus.

Referring to the drawings, wherein like reference characters designate like or corresponding parts throughout the several views, FIG. 8 diagrammatically shows a tape traveling system of a magnetic tape recording/reproducing apparatus according to the present invention.

The apparatus includes a main chassis 11, and a supply reel carrier 12 and a take-up reel drive gear 13 which are mounted on a portion (lower portion in FIG.

8) of the main chassis 11. A cassette housing (not shown) on which a tape cassette is adapted to be loaded is vertically movably supported above this portion of the chassis 11. The supply reel carrier 12 and the take-p reel drive gear 13 are operatively connected with a capstan motor (not shown) for co-rotation with a capstan described later. As is well known, the tape cassette includes a housing, not shown, that contains a supply reel 14 and a take-up reel 15 that link a length of magnetic recording tape 16. The housing of the tape cassette includes a plurality of guide poles 17.

The main chassis 11 carries on another portion (upper portion in FIG. 8) a drum 18. Disposed on one side (left side in FIG. 8) of the drum 18 are a loading guide pole 19, an inclined loading pole 20, an impedance roller 21, an inclined pole 22 and a tension pole 23 described below in greater detail. On the opposite side (right side in FIG. 8) of the drum 18, a loading guide pole 24, an inclined loading pole 25, an inclined pole 26, a middle pole 27, an A/C head 28, a guide roller 29, a pinch roller 30 and the capstan 31 are disposed. The drum 18 is composed of a lower drum fixed to the main chassis 11 and an upper drum provided with a magnetic head. The upper drum is driven by a drum motor (not shown). The loading guide pole 19 and the inclined loading pole 20 are supported by a pole base (not shown). Similarly, the loading guide pole 24 and the inclined loading pole 25 are supported by another pole base (not shown). These pole bases are movably supported and driven by a mode control motor (not shown) to move along a predetermined path. In the loading mode, the loading poles 19, 20, 24, 25 (hereinafter designated by "LP" for brevity) move in one direction (upward in FIG. 8) to withdraw a segment of the magnetic tape 16 from the tape cassette until the tape segment extends around the drum 18 over a predetermined angular range, as shown in FIG. 8. In the unloading mode, the loading poles LP move in the opposite direction to allow the magnetic tape 16 to retract into the tape cassette The drum 18, the impedance roller 21, the inclined poles 22, 26, the middle pole 27, the A/C head 28, the guide roller 29, the pinch roller 30 and the capstan 31 do not relate to the principle of the present invention and hence a further description of those components is no longer needed.

As shown in FIGS. 1 through 4, the tension pole 23 is upstanding, or stands straight, from a distal end of a tension arm 32. The proximal end of the tension arm 32 is pivotally supported by an elongate slide plate 33. The slide plate 33 constitutes a support member for the tension arm 32. As shown in FIG. 5, a limit plate 34 is slidably mounted on the slide plate 33. The slide plate 33, as shown in FIG. 7, has two oblong guide holes 33a, 33b extending longitudinally along its one end portion (lower end portion in this figure) and its intermediate portion, respectively, a locking hole 33c adjacent to the oblong guide hole 33b, and an oblong hole 33d extending longitudinally along its opposite end portion (upper end portion in this figure). The slide plate 33 further includes a spring retaining lug 33e, a cam face 33f and a step-like engagement portion 33g that are disposed on the one end portion (lower end portion in the same figure) of the slide plate 33, and an upstanding support pin 35 adjacent to an upper end edge of the oblong guide hole 33a. The oblong guide holes 33a, 33b of the prox-slide plate 33 slidably receive respectively therein a pair of guide pins 36a, 36b upstanding from an upper surface of the main chassis 11. The locking hole 33c loosely receives therein a drive pin 37a disposed on a drive lever 37 described later. The oblong hole 33d receives therein a tension coil spring 38 whose one end (lower end in FIG. 1) is secured to the slide plate 33 adjacent to one end (lower end in the same figure) of the oblong hole 33d. The slide plate 33 is driven by the pivotal movement of the drive lever 37, with the guide pins 36a, 36b slidably received in the oblong guide holes 33a, 33b, so that the slide plate 33 reciprocates along a path parallel to its longitudinal axis (in the vertical direction in FIG. 1).

The cam face 33f of the slide plate 33 is slidably engageable with a pin on a plate (neither shown) for connection with a brake mechanism, not shown, provided for the take-up reel drive gear 13. The engagement portion 33g is engageable with a cancel plate for releasing a housing lock mechanism, not shown.

The limit plate 34, as shown in FIG. 6, comprises a substantially elongate plate and has an oblong spring-receiving hole 34a and an oblong guide hole 34b disposed side by side and extending longitudinally along its one end portion (upper end portion in this figure), an oblong guide hole 34c extending longitudinally along its opposite end portion (lower end port±on in the same figure), and an oblong locking hole 34d disposed adjacent to an upper end of the oblong guide hole 34c and extending transverse to the oblong guide hole 34c. The limit plate 34 further includes a stopper portion 34e disposed at its opposite end portion and engageable with a guide pin, described later, of the tension arm 32. The oblong spring receiving hole 34a of the limit plate 34 receives therein the spring 38. The oblong guide holes 34b, 34c slidably receive respectively therein a pair of guide pins 39a, 39b disposed on the slide plate 33. The locking hole 34d slidably receives therein the drive pin 37a of the drive lever 37 which extends through the locking hole 33c of the slide plate 33. The one end of the spring 35 is secured to the slide plate 33 adjacent to the lower end of the oblong hole 33d as described above, while the opposite end of the spring 28 is secured to the limit plate 34 adjacent to one end (upper end in FIG. 1) of the oblong hole 34a. The thus connected spring 38 urges the slide plate 33 and the limit plate 34 toward each other until the guide pins 39a, 39b on the slide plate 33 are held in contact with the upper end edges of the respective oblong guide holes 34b, 34c in the limit plate 34. The slide plate 33 and the limit plate 34 thus connected by the spring 38 are relatively movable through a limited distance which is determined by the length of the oblong guide holes 34b, 34c. Furthermore, these plates 33, 34 are integrally drivable by the drive pin 37a of the drive lever 37 so that the stopper portion 34e engages the guide pin on the tension arm 32 to limit pivotal movement of the tension arm 32.

Figure 1:
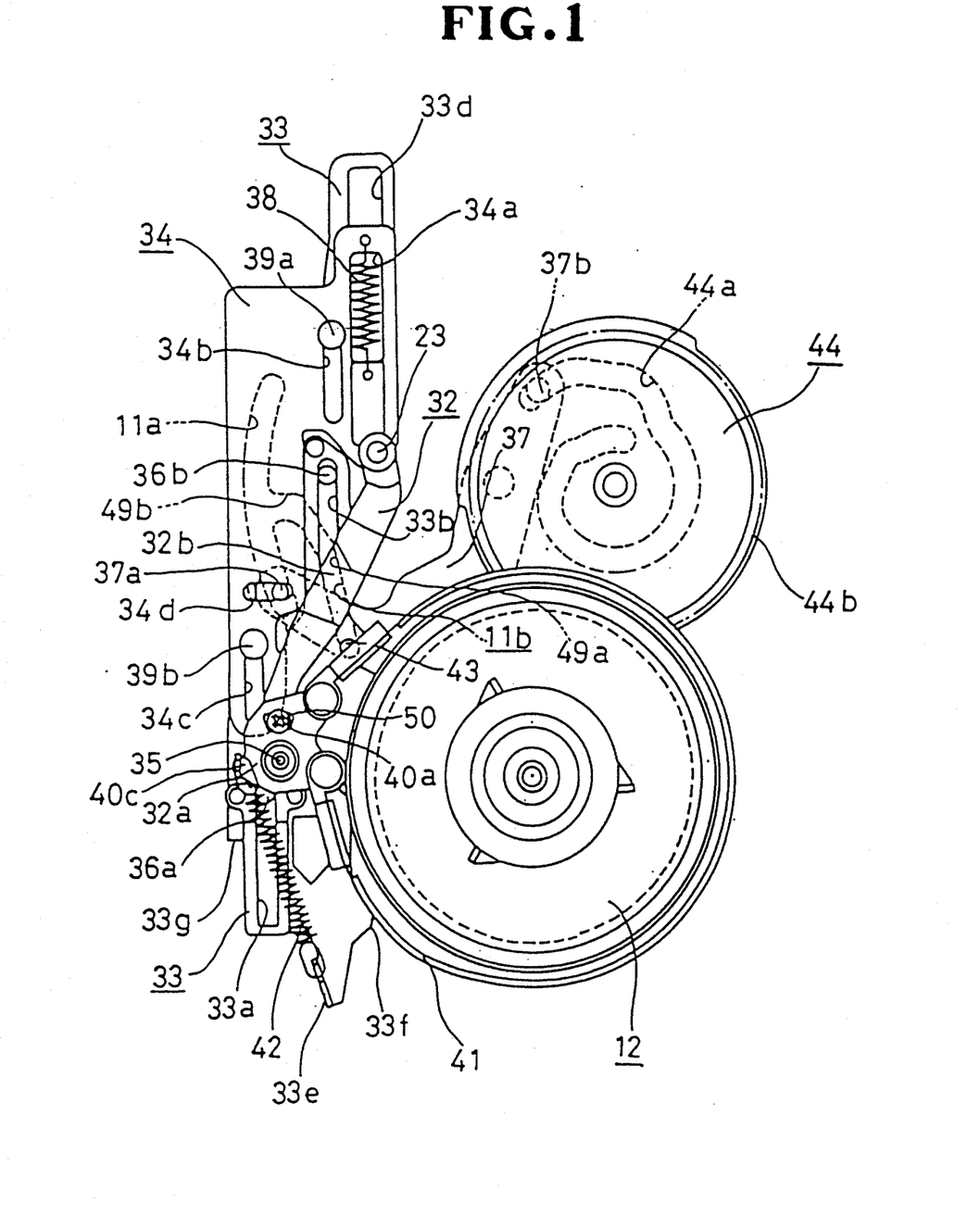
FIG. 1 is a plan view of a main portion of a magnetic tape recording/reproducing apparatus according to the present invention.

The limit plate 34 is engageable with an arm (not shown) supporting thereon the impedance roller 21 when the loading poles LP move upward in FIG. 1. With this engagement, the impedance roller 21 is displaced out of alignment with a path of movement of the loading poles LP. Thus, the interference between the impedance roller 21 and the loading poles LP can be avoided.

The tension arm 32 has an enlarged proximal end portion 32a and an elongate arm portion 32b extending integrally from the proximal end portion 32a. The proximal end portion 32a is pivotally mounted on a support pin 35. The tension pole 23 is supported on the distal end of the arm portion 32b. The proximal end portion 32a has an arcuate adjustment hole 40a extending concentrically around the support pin 35. The arm portion 32b has a threaded hole (not shown) corresponding in position to the position of the arcuate adjustment hole 40a. A screw 50 extends through the arcuate adjustment hole 40a in the proximal end portion 32a and is threaded into the threaded hole in the arm portion 32b to assemble the proximal end portion 32a and the arm portion 32b. The relative position of the proximal end portion 32a and the arm portion 32b thus assembled is adjustable in the circumferential direction about support pin 35 within a limited range which is determined by the length of the arcuate adjustment hole 40a. The proximal end portion 32a has an attachment portion located on one side of the support pin 35 and connected to opposite ends of a brake band 41, and a spring retaining lug 40c located on the opposite side of the support pin 35. The spring retaining lug 40c is connected to one end of a tension coil spring 42. The brake band 41 is wound around the supply reel carrier 12 so that when the tension arm 32 turns in the counterclockwise direction in FIG. 1, the brake band 41 grips the supply reel carrier 12 to brake the rotation of the supply reel carrier 12. The spring 42 extends between the spring retaining lug 40c on the proximal end portion 32a and the spring retaining lug 33e on the slide plate 33 and urges the tension arm 32 to turn counterclockwise in FIG. 1 about the support pin 35. The arm portion 32b includes, additional to the upstanding tension pole 23 described above, a guide pin 43 depending from an intermediate portion thereof. The guide pin 43 is slidably received in a guide groove 11b formed in the main chassis 11. The guide groove 11b includes a first portion 49a extending substantially longitudinally of the slide plate 33 and a second portion 49b extending substantially transversely of the slide plate 33. The first and second groove portions 49a, 49b join gently together without forming an acute angle therebetween. The second portion 49b is also connected with a guide groove 11a described later.

The drive lever 37 is disposed on the underside of the main chassis 11 and pivoted at its intermediate portion to the main chassis 11. The drive lever 37 has one end on which the drive pin 37a is disposed. The drive pin 37a extends through the guide groove 11a and is received in the locking hole 33c in the slide plate 33 and the locking hole 34d in the limit plate 34. The drive lever 37 further has, on its opposite end, a pin 37b slidably received in a spiral cam groove 44a formed in a cam gear 44. The cam gear 44 is a circular disc and rotatably mounted on the main chassis 11. The cam gear 44 has a row of gear teeth 44b on its peripheral wall, the gear teeth 44b extending around the spiral cam groove 44a. The cam gear 44 is operatively connected to a mode control motor via a gear train meshing with the gear teeth 44b and is drive by the mode control motor for movement together with the pole bases described above.

Though not shown, the mode control motor is operatively connected through various mechanisms to the pole bases on which the loading poles LP are supported.

In the magnetic tape recording/reproducing apparatus of the illustrated embodiment, the tension arm 32 having the tension pole 23 on its distal end is pivotally mounted on the slide plate 33 drivable by the mode control motor. In response to actuation of an actuating button such as an eject button (EJECT), a fast-forward or rewind button (FF/REW), a pause button (REC LOCK), a play button (PLAY) or a stop button (STOP), the loading motor is energized to move the slide plate 33 into a position corresponding to a selected mode in synchronism with the operation of the loading poles LP.

Figure 2:
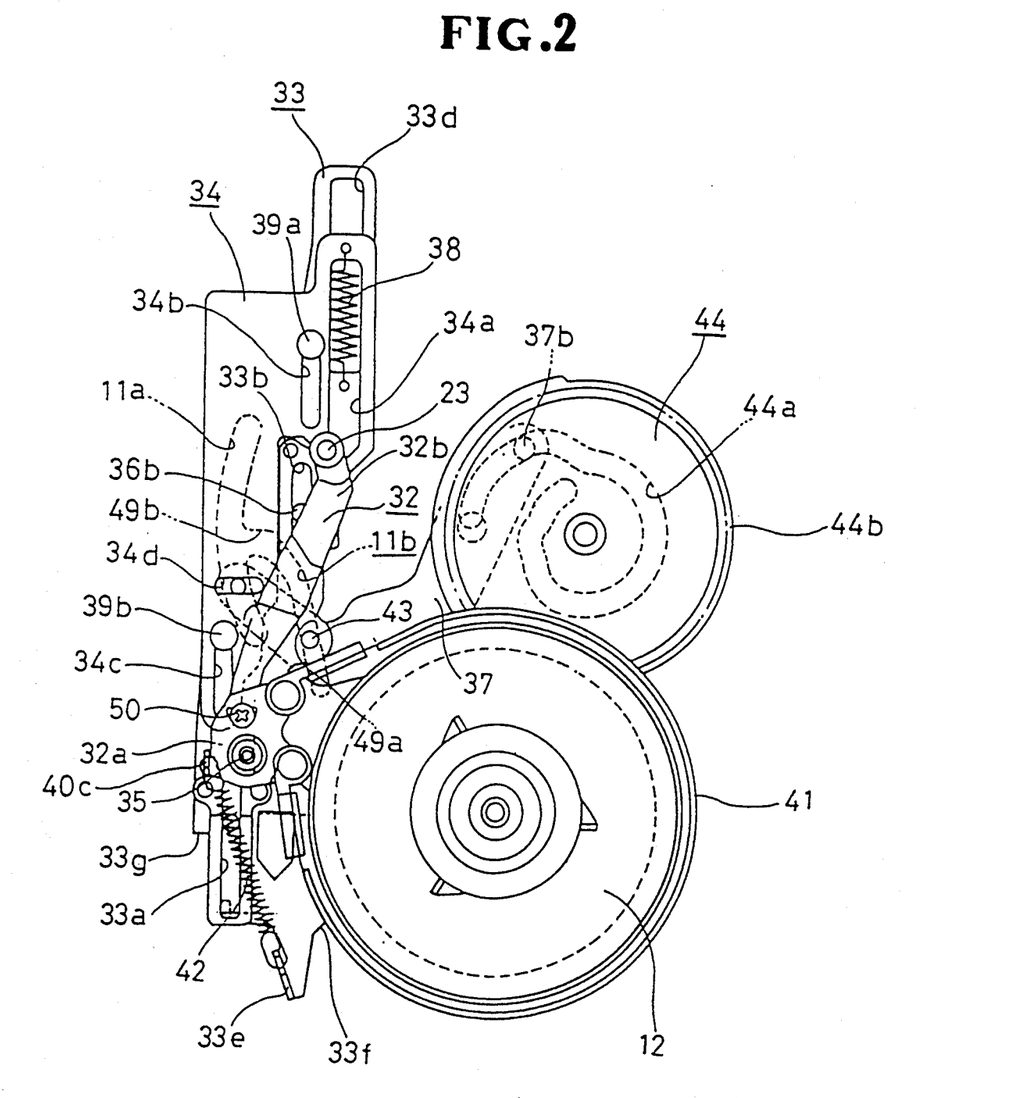
FIG. 2 is a view similar to FIG. 1, but showing the apparatus with parts in a different mode position.

For instance, when a tape cassette is loaded on the magnetic tape recording/reproducing apparatus of this invention, the cam gear 44 is disposed in the FF/REW position shown in FIG. 2. In this instance, the pin 37b on the drive lever 37 is displaced a distance from an outer end of the spiral cam groove 44a toward the inner end; the slide plate 33 is disposed in a position near its one endmost position (lowermost position in the same figure); and the fulcrum of the tension arm 32, i.e. the support pin 35 is disposed in a position near its one endmost position (lowermost position in the same figure). The guide pin 43 on the tension arm 32 is disposed at a lower part of the first portion 49a of the guide groove 11b. The guide pin 43 thus received in the guide groove 11b is not movable in the transverse direction of FIG. 2 so that the movement of the tension pole 23 in the same direction is prevented. The tension pole 23 is disposed in a position corresponding to the position of a recess in a front lower portion of the tape cassette, not shown. The loading poles LP are also disposed in a position corresponding to the position of the recess in the tape cassette. The tension pole 23 and the loading poles LP are, therefore, receivable in the recess when the tape cassette is lowered during the loading operation.

Figure 3:
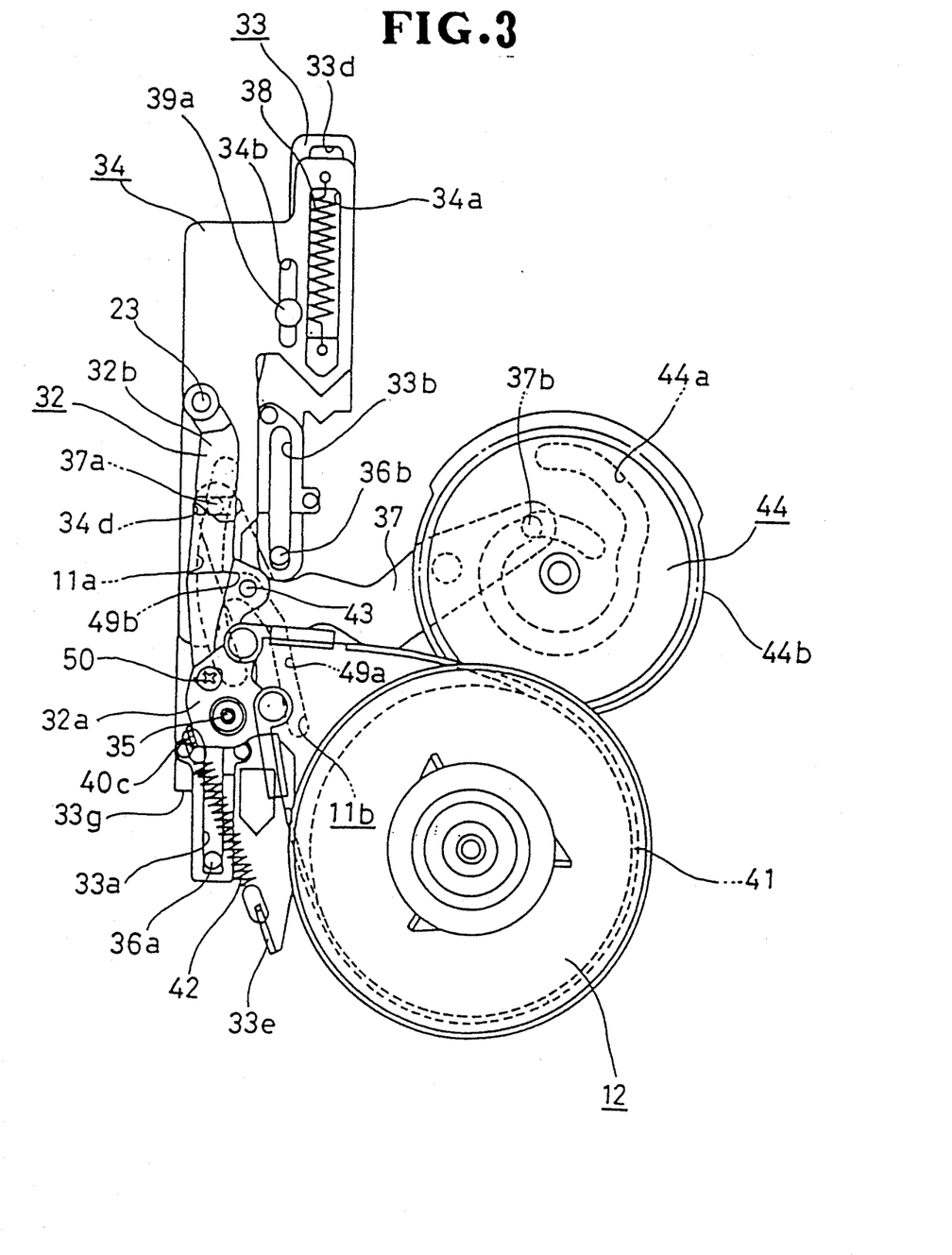
FIG. 3 is a view similar to FIG. 1, but showing the apparatus with parts in another different mode position.

When the loading of the tape cassette is finished, the cam gear 44 is driven by the mode control motor to turn counterclockwise through a predetermined angle from the position of FIG. 2 to the REC LOCK mode position shown in FIG. 3. Simultaneously therewith, the slide plate 33 is displaced toward its opposite endmost position (upward in FIG. 3) by a predetermined distance, thereby causing the support pin 35 to move in the same direction. In response to the angular movement of the cam gear 44, the guide pin 43 on the tension arm 32 slides upwardly in FIG. 3 along the first portion 49a of the guide groove 11b and enters the second portion 49b, thereby displacing the entire body of the tension arm 32 toward the upper left in the same figure. In this instance, the stopper portion 34e of the limit plate 34 is located in registry with the junction between the guide groove 11b and the guide groove 11a. The guide pin 43 urged by the spring 42 is brought into abutment with the stopper portion 34e whereupon a further leftward movement of the guide pin 43 and hence the movement of the tension arm 32 is prohibited. A tension servo mechanism is thus held in a non-operative condition. The tension pole 23 is disposed in an inside position tending to lower or release the tape tension so that the tape segment, which is withdrawn from the tape cassette to form a tape path and held at rest, is protected from damage.

Figure 4:
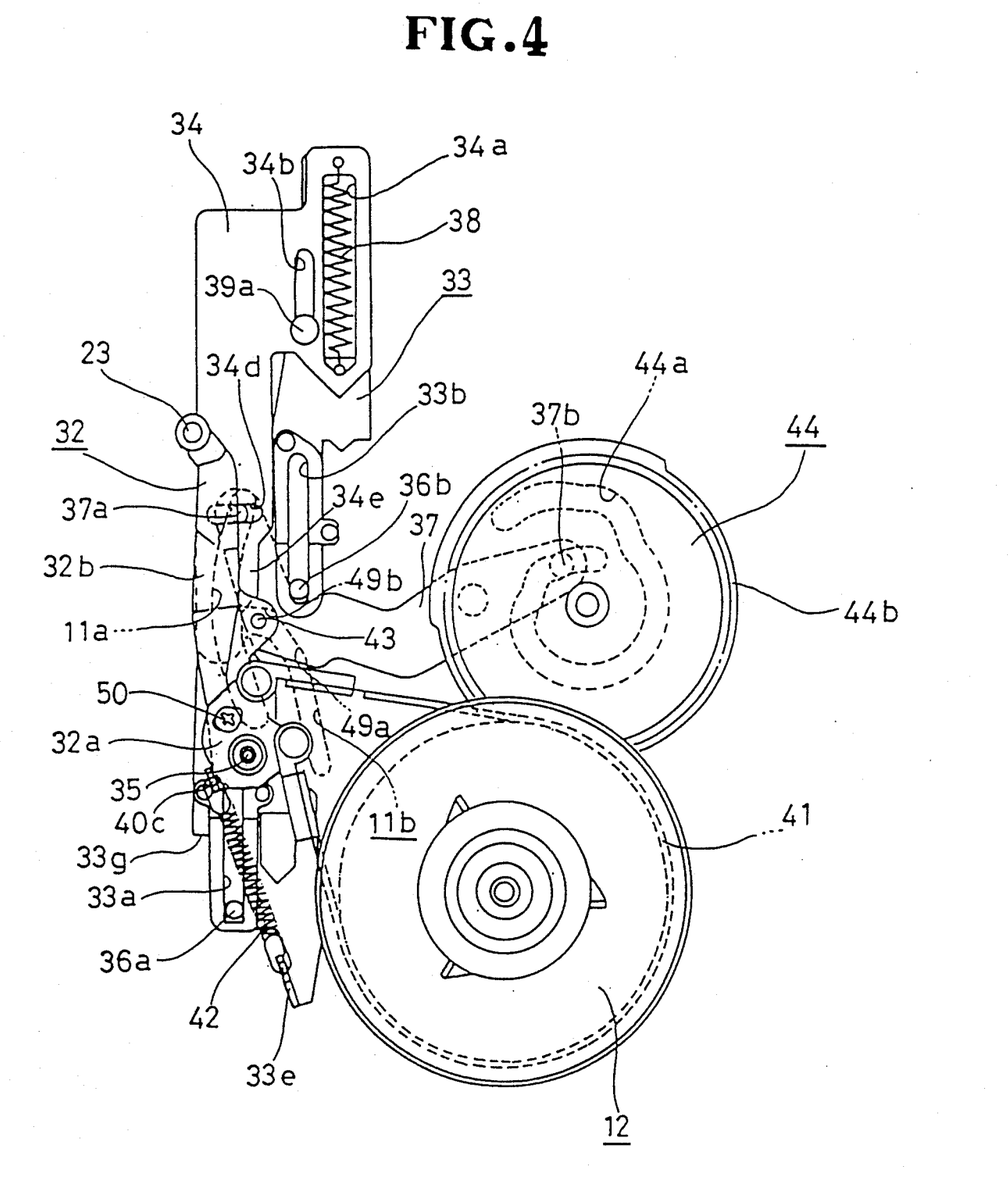
FIG. 4 is a view similar to FIG. 1, but showing the apparatus with parts in still another different mode position.
Figures 5, 6, 7:
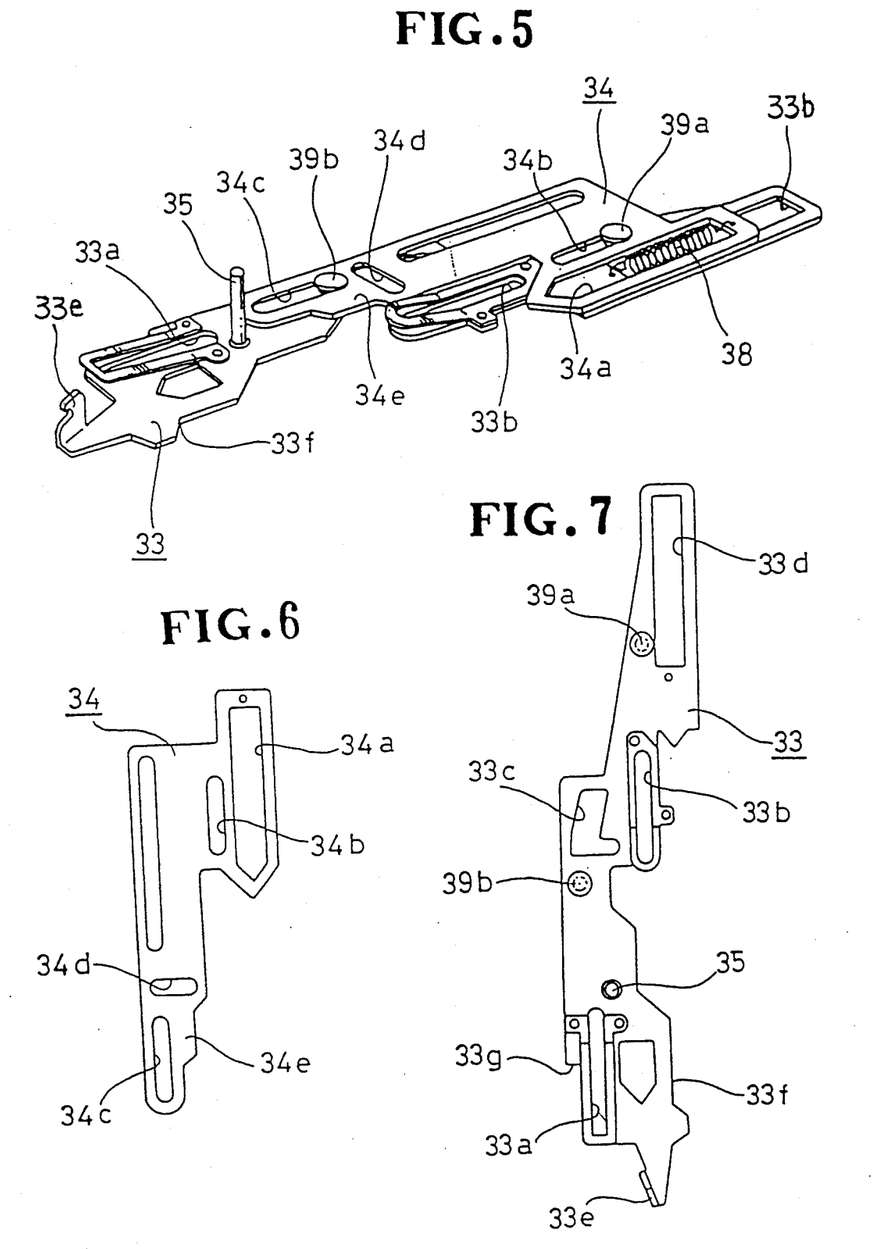
FIG. 5 is a perspective view of a slide plate and a limit plate assembled together of the apparatus.
FIG. 6 is a plan view of the limit plate.
FIG. 7 is a plan view of the slide plate.

When the PLAY button or the REC button is actuated (i.e. when PLAY mode or REC mode is selected), the cam gear 44 is further turned counterclockwise through a predetermined angle to the position shown in FIG. 4. In this instance, the limit plate 34 solely moves toward its one endmost position (upward in the same figure), causing the stopper portion 34e to disengage the guide pin 43 and open the guide groove 11b. Consequently, the tension arm 32 is permitted to turn counterclockwise under the force of the spring 42, thereby displacing the tension pole 23 leftward in FIG. 4. Thus, the tension servo mechanism becomes active and exerts a tension on the magnetic tape 16. More specifically, when the tape tension is smaller than the desired level and hence tends to slacken the magnetic tape 16, the tension arm 32 turns counterclockwise about the support pin 35 to cause the brake band 41 to contract, so that a greater braking force is applied to the supply reel carrier 12. Conversely when the tension on the magnetic tape 16 is larger than the desired level, the tension arm 32 turns clockwise about the support pin 35 to slacken the brake band 41, thereby lowering the braking force on the supply reel carrier 12. Thus, the tension arm 32 pivots about the support pin 35 in response to the tension on the magnetic tape 16 to adjust the braking force on the supply reel carrier 12 for maintaining the tape tension at a constant level. In the PLAY mode or the REC mode, the limit plate 34 is displaced upward in FIG. 4 against the force of the spring 38, which spring force serves to position the limit plate 34 relative to the slide plate 33.

Thereafter, when the PAUSE button is actuated, the cam gear 44 is turned clockwise through a predetermined angular distance to the position shown in FIG. 3. This angular movement of the cam gear 44 causes the limit plate 34 to move toward its opposite endmost position (downward in the same figure) whereupon the stopper portion 34e of the limit plate 34 engages the guide pin 43 and then forces the guide pin 43 rightward in the same figure to displace the tension arm 32 and the tension pole 23 in a direction (toward the supply reel carrier 12) to lower or release the tension on the magnetic tape 16.

When the FF/REW button is actuated, the parts of the apparatus are brought into the position shown in FIG. 2. The cam gear 44 is turned clockwise and the tension pole 23 is disposed in the recess in the front lower portion of the tape cassette. Under such condition, the magnetic tape 16 is fed in the forward direction at a fast-forward speed or rewound at a rewinding speed. During that time, the tension pole 23 is held out of contact with the magnetic tape 16 running at high speed.

When the STOP button is actuated in place of the FF/REW button, the parts of the apparatus are brought into the position shown in FIG. 2, in the same manner as done in the FF/REW mode, and traveling of the magnetic tape 16 comes to a halt.

When the EJECT button is actuated, the cam gear 44 turns clockwise through a predetermined angular distance from the position of FIG. 2 to the position shown in FIG. 1. The pin 37b on the drive lever 37 is disposed at the outer end of the spiral cam groove 44a, and the slide plate 33 is disposed in its one endmost position (lowermost position in FIG. 1). A lock((not shown) in the housing of the tape cassette is released whereupon the tape cassette is lifted and then ejected from the magnetic tape recording/reproducing apparatus.

As described above, the magnetic tape recording/reproducing apparatus of this invention includes a slide plate 33 movable in a position corresponding to the selected mode, and a tension arm 32 pivotally mounted on the slide plate 33. The tension arm 32 is, therefore, movable as a whole in response to the movement of the slide plate 33. Consequently, the tension arm 32 is held out of interference with the magnetic tape 16 and other poles even when the tape path is changed. This arrangement provides an increased degree of freedom of the arrangement of the inclined pole 22 and other component parts of the tape traveling system. The tension arm 32 thus provided does not cause an enlargement of the size of the tape traveling system but is contributive to the reduction of the overall size of the magnetic tape recording/reproducing apparatus.

In the illustrated embodiment, the control of the tension arm 32 is entirely relied upon the movement of the slide plate 33. However, it is possible to modify the apparatus in such a manner that the movement of the tension pole 23 from the unloading position in which the tension pole 23 is disposed in the recess in the tape cassette, to the loading position in which the tension servo mechanism is activated, is relied upon the displacement of the fulcrum of the tension arm 32 by means of the slide plate 33 or a support member such as a link member; other movements of the tension pole 23 are controlled by other mechanisms.

Although the magnetic tape recording/reproducing apparatus of the foregoing embodiment comprises a video tape recorder (VTR), the present invention can effectively be applied to digital audio tape recorders (R-DAT).

Obviously various minor changes and modifications of the present invention are possible in the light of the above teaching. It is therefore to be understood that within the scope of the appended claims the invention may be practiced otherwise than as specifically described.

What is claimed is:

1. A magnetic tape recording/reproducing apparatus, comprising:
    a main chassis;
    means mounted on said chassis for withdrawing a segment of a magnetic tape between supply and take-up reels in a tape cassette in such a manner that the tape segment forms a traveling path which is variable to conform to a selected one of a plurality of modes of operation of said magnetic tape recording/reproducing apparatus; and
    means mounted on said chassis for controlling tension on the magnetic tape at a constant level during at least one of the operation modes of said apparatus, said tension control means including
    (i) a tension pole engageable with the tape segment to adjust the tension on the magnetic tape,
    (ii) a support member movable along a predetermined path between a plurality of positions corresponding to the operation modes of said apparatus, and
    (iii) a tension arm pivotally mounted on said support member and having a distal end on which said tension pole is disposed, and further having a pivot axis movable together with said support member;
    wherein said support member is movable relative to said chassis and said supply reel such that said pivot axis of said tension arm is movable relative to said chassis and said supply reel.

2. A magnetic tape recording/reproducing apparatus according to claim 1, wherein said tension arm includes a proximal end portion pivoted on said support member and an arm portion connected at its one end to said proximal end portion and supporting on its opposite end said tension pole, said arm portion being adjustable in position relative to said proximal end portion.

3. A magnetic tape recording/reproducing apparatus according to claim 1, further including means for driving said support member, said driving means including a cam disc angularly movable to a position corresponding to the selected operation mode of said apparatus and having a substantially spiral guide groove, and a drive arm pivotable about its intermediate portion and having a pin on one end thereof and a drive pin on the opposite end thereof, said pin being slidably received in said guide groove, said drive pin being coupled with said support member.

4. A magnetic tape recording/reproducing apparatus according to claim 1, further including a main chassis on which said support member is movably disposed, and a means for causing said tension arm to pivot between a standby position in which said tension pole is disposed remote from said traveling path of the magnetic tape, and an operating position in which said tension pole is disposed in registry with said traveling path of the magnetic tape, said causing means including a guide groove defined in said chassis and a guide pin disposed on said tension arm and slidably received in said guide groove.

5. A magnetic tape recording/reproducing apparatus, comprising:
   (a) means for withdrawing a segment of a magnetic tape between supply and take-up reels in a tape cassette in such a manner that the tape segment forms a traveling path which is variable to conform to a selected one of a plurality of modes of operation of said magnetic tape recording/reproducing apparatus;
   (b) means for controlling tension on the magnetic tape at a constant level during at least one of the operation modes of said apparatus, said tension control means including
      (i) a tension pole engageable with the tape segment to adjust the tension on the magnetic tape,
      (ii) a support member movable along a predetermined path between a plurality of positions corresponding to the operation modes of said apparatus, and
      (iii) a tension arm pivotally mounted on said support member and having a distal end on which said tension pole is disposed, and further having a pivot axis movable together with said support member;
   a main chassis on which said support member is movably disposed, and a means for causing said tension arm to pivot between a standby position in which said tension pole is disposed remote from said traveling path of the magnetic tape, and an operating position in which said tension pole is disposed in registry with said traveling path of the magnetic tape, said causing means including a guide groove defined in said chassis and a guide pin disposed on said tension arm and slidably received in said guide groove, said guide groove having a first portion extending generally parallel to said predetermined path of said support member and a second portion contiguous to said first portion and extending transverse to said predetermined path, said guide pin being disposed within said second groove portion during said at least one operation mode of said apparatus.

6. A magnetic tape recording/reproducing apparatus according to claim 5, further including a limit plate assembled with said support member for preventing said guide pin from moving from said first groove portion into said second groove portion.

7. A magnetic tape recording/reproducing apparatus according to claim 6, wherein said limit plate is movable relatively to said support member to release said guide pin for allowing said pivot arm to move into said operating position.

8. A magnetic tape recording/reproducing apparatus, comprising:
   (a) means for withdrawing a segment of a magnetic tape between supply and take-up reels in a tape cassette in such a manner that the tape segment forms a traveling path which is variable to conform to a selected one of a plurality of modes of operation of said magnetic tape recording/reproducing apparatus; and
   (b) means for controlling tension on the magnetic tape at a constant level during at least one of the operation modes of said apparatus, said tension control means including
      (i) a tension pole engageable with the tape segment to adjust the tension on the magnetic tape,
      (ii) a support member movable along a predetermined path between a plurality of positions corresponding to the operation modes of said apparatus, and
      (iii) a tension arm pivotally mounted on said support member and having a distal end on which said tension pole is disposed, and further having a pivot axis movable together with said support member, said tension arm including a proximal end portion pivoted on said support member and an arm portion connected at its one end to said proximal end portion and supporting on its opposite end said tension pole, said arm portion being adjustable in position relative to said proximal end portion, said proximal end portion having an arcuate adjustment hole concentric with said pivot axis, said arm portion having a threaded hole corresponding in position to the position of said arcuate adjustment hole, said proximal end portion and said arm portion being fastened together by a screw extending through said arcuate adjustment hole and threaded into said threaded hole.

* * * * *